United States Patent [19]
Tsai et al.

[11] Patent Number: 6,084,566
[45] Date of Patent: Jul. 4, 2000

[54] PATTERN DISPLAY CIRCUIT

[75] Inventors: Johnny Tsai, Hsichu; Roy Chen, Taipei, both of Taiwan

[73] Assignee: Motorola, Inc., Schaumburg, Ill.

[21] Appl. No.: 08/998,696

[22] Filed: Dec. 29, 1997

[51] Int. Cl.[7] .................................................. G09G 5/00
[52] U.S. Cl. ........................................... 345/115; 348/181
[58] Field of Search ..................................... 348/181–183, 348/190, 569, 806, 807; 315/368.18, 365; 345/27, 113, 114, 115, 339, 213, 214

[56] References Cited

U.S. PATENT DOCUMENTS

| | | | |
|---|---|---|---|
| 4,495,519 | 1/1985 | Wahlquist | 348/183 |
| 5,319,446 | 6/1994 | Emmoto et al. | 348/181 |
| 5,699,111 | 12/1997 | Dairiki et al. | 348/181 |

*Primary Examiner*—Dennis-Doon Chow

[57] ABSTRACT

A circuit (12) for generating a line pattern display (100) comprises: a display for generating display elements which extend in first direction and second directions; first (14) and second (20) memories for holding values representative of pattern spacing in the first and second directions respectively; and a first (16, 18) and second (22, 24) logic circuits coupled to the memories to produce display elements in lines at positions spaced apart by a distance representative of the value stored in the first memory and along lines whose positions in the second direction are spaced apart by a distance representative of the value stored in the second memory. The circuit can easily be integrated with on-screen-display circuitry.

4 Claims, 2 Drawing Sheets

PATTERN DISPLAY CIRCUIT

FIELD OF THE INVENTION

This invention relates to a circuit for use in generating a line pattern display, and particularly though not exclusively a rectilinear grid pattern.

BACKGROUND OF THE INVENTION

To adjust the geometry of a display such as a CRT monitor for a computer system, it is desirable to produce on the display a symmetric pattern such as a rectilinear hatch or grid. The effect of geometric adjustments made to the display can easily be seen by their effect on the symmetry of the grid.

Conventionally, in order to display a grid it is necessary to use an external display generator to produce the necessary pattern. Such an external display generator is expensive and is typically used only by the manufacturers of displays such as monitors.

Although it would be desirable to produce the necessary display pattern internally, so avoiding the need for an external display generator and allowing both the manufacturer and any subsequent user of the display to utilize the pattern in adjustment of the display, such internal pattern production presents practical difficulty. If the display pattern is to be produced on a 1,280 by 1,024 pixel screen, the necessary monochrome screen image will require 160 kilobytes of memory for storage. Such a large of amount of memory adds considerably to the cost of an integrated circuit component, such as an on-screen display (OSD) device, which could conveniently be utilized for storage and generation of the image. Also, if the display pattern is to be produced in a variety of display modes with different pixel sizes, either a number of different images must be stored (e.g., one for each different pixel size display mode) further compounding the storage problem, or some mechanism must be found for converting a stored image for one pixel size display mode into a different image for a different pixel size display mode.

It is an object of this invention to provide a circuit for use in generating a line pattern display in which the above disadvantages are alleviated.

BRIEF SUMMARY OF THE INVENTION

In accordance with the present invention there is provided a circuit for use in generating a line pattern display as claimed in claim 1.

BRIEF DESCRIPTION OF THE DRAWINGS

One embodiment of the invention will now be more fully described, by way of example only, with reference to the accompanying drawings, in which.

DETAILED DESCRIPTION OF THE DRAWINGS

Figure 1:
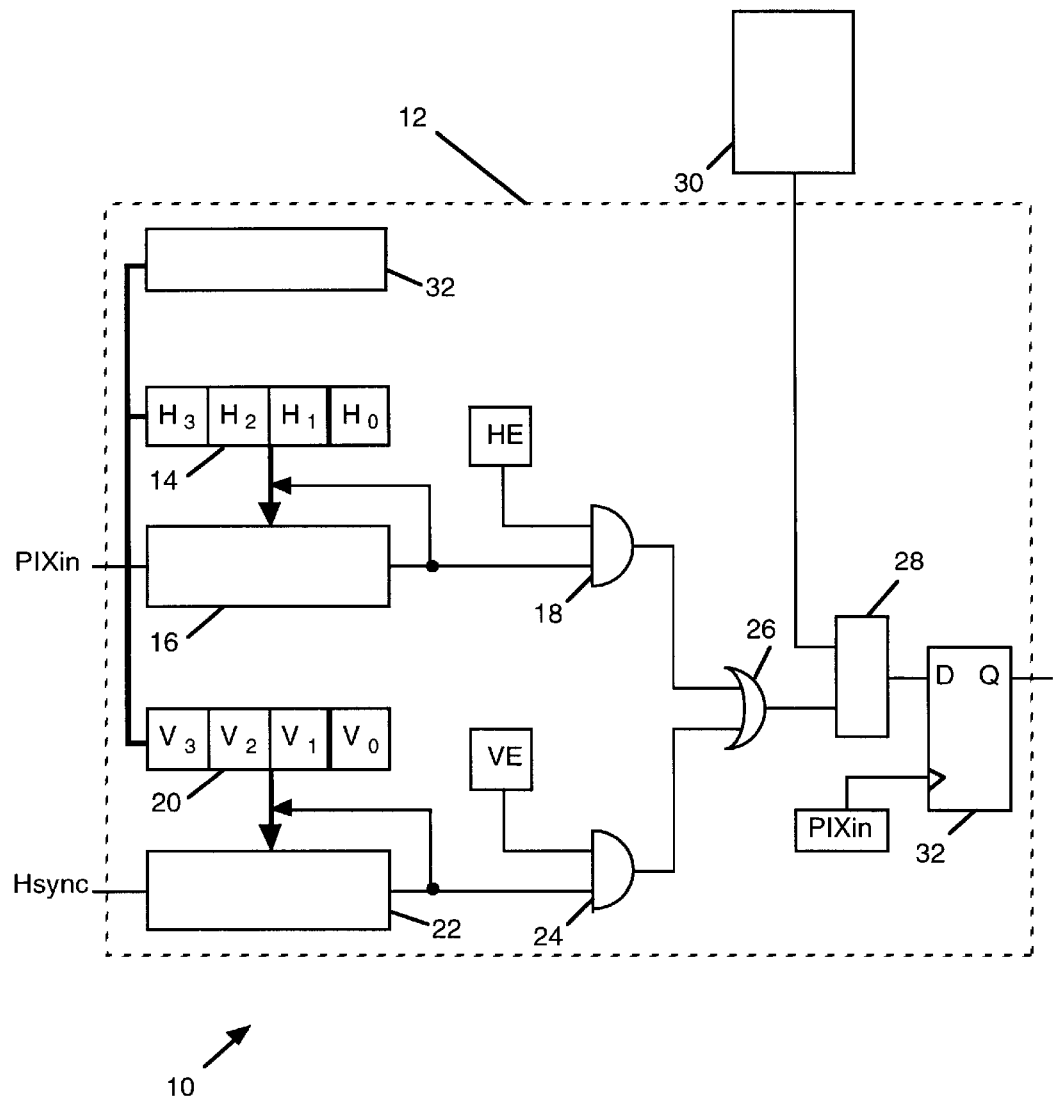
FIG. 1 shows a block diagram of a circuit for generating a grid pattern in conjunction with an on-screen display.
Figure 2:
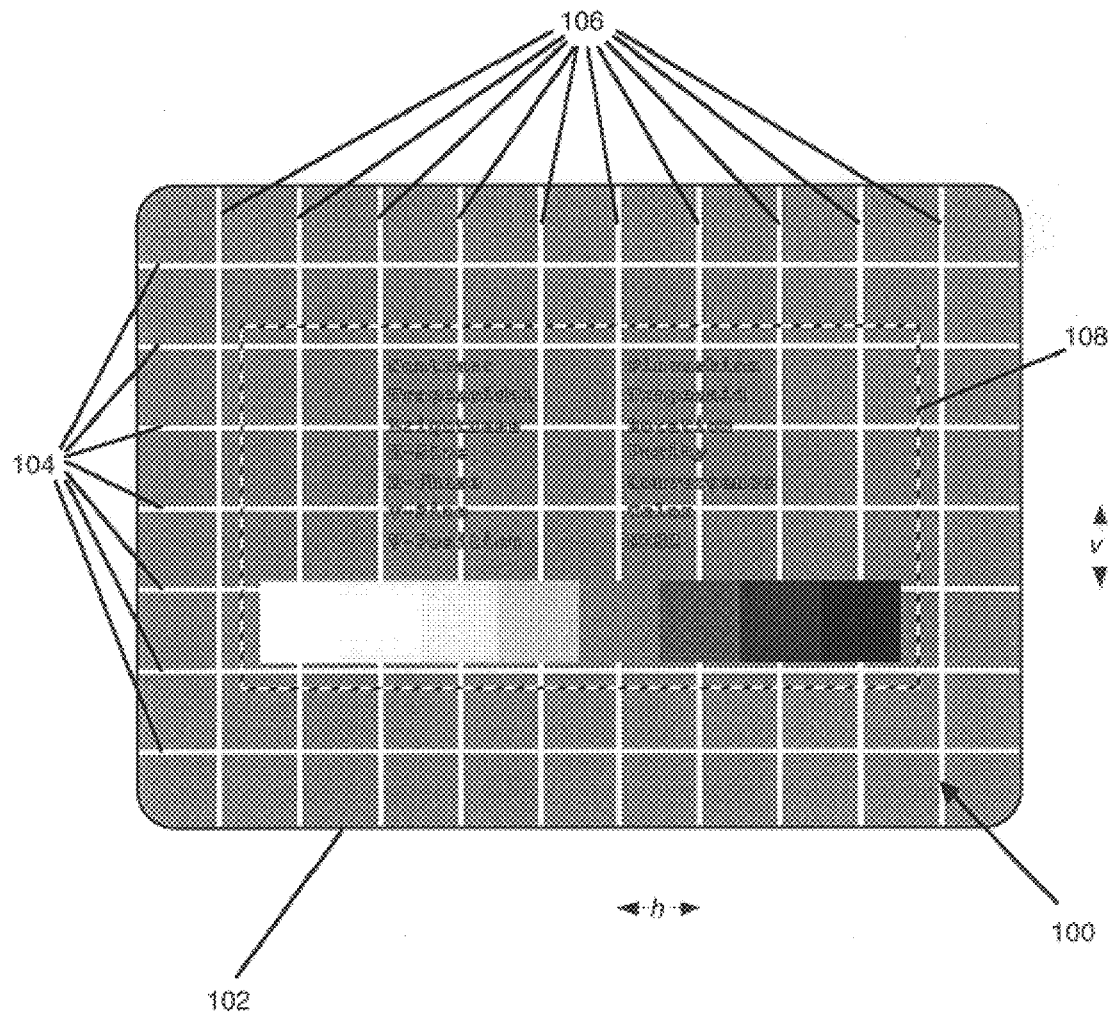
FIG. 2 shows an example of the display pattern and on-screen display menu produced by the circuit of FIG. 1.

Referring firstly to FIG. 1, in an on-screen display device 10, a circuit 12 is provided for displaying a rectilinear hatch or grid pattern. As shown in FIG. 2, the rectilinear hatch or grid pattern 100 displayed on the screen 102 of a cathode ray tube (CRT) or liquid crystal display (LCD) has a number of parallel horizontal lines 104 which are intersected perpendicularly by a number of parallel vertical lines 106. As can be seen, the parallel horizontal lines 104 are spaced apart by a uniform distance v, and the parallel vertical lines 106 are spaced apart by a uniform distance h.

The grid pattern display circuit 12 includes a register 14 for holding a four-bit binary value ($H_0$–$H_3$). A programmable decrementing counter 16 is connected to be loaded with the value from the register 14 and to receive a clock signal PIXin from the display system's pixel clock. The output of the counter 16, which produces a pulse when the counter reaches zero, is connected to one input of a two-input AND logic gate 18, whose other input is connected to receive an enable signal HE. The output of the counter 16 is also connected to trigger re-loading of the counter with the value from the register 14.

The grid pattern display circuit 12 includes a register 20 for holding a four-bit binary value ($V_0$–$V_3$). A programmable decrementing counter 22 is connected to be loaded with the value from the register 20 and to receive a clock signal Hsync from the display system's horizontal sync circuitry (not shown). The output of the counter 22, which produces a pulse when the counter reaches zero, is connected to one input of a two-input AND logic gate 24, whose other input is connected to receive an enable signal VE. The output of the counter 22 is also connected to trigger re-loading of the counter with the value from the register 20.

The outputs from the AND gates 18 and 24 are connected to inputs of an OR logic gate 26, whose output is connected to one input of a multiplexer 28. Another input of the multiplexer 28 is connected to receive pixel signals from on-screen display circuitry 30. The output of the multiplexer 28 is connected to the data input of a D-type flip-flop 32, whose clock input is connected to receive the display system's pixel clock signal PIXin. The output Q from the flip-flop 32 produces a resultant pixel signal which is applied to the display.

In use of the grid pattern display circuit 12, upon selection of a display mode values equal to the horizontal and vertical pixel spacing of the grid pattern 100 are respectively loaded (from predetermined values in memory 34) into the registers 14 and 20, and these register values are loaded into the respective counters 16 and 22. As will be explained below, these values, together with the pixel resolution of the selected display mode, determine the grid line spacing distances h and v.

With each pulse of the pixel clock signal PIXin, the counter 16 is decremented. When the count of the counter 16 reaches zero, the counter produces an output pulse which causes the counter to be reloaded with the value from the register 14. The output pulse from the counter 16 also (assuming that the enable signal HE is active) causes the AND gate 18 to produce an output signal, which is applied via the OR gate 26, the multiplexer 28 and the flip-flop 32 to the display. Thus, in each horizontal line of the display, the display is activated at every pixel for which the counter 16 produces an output pulse. The result of thus activating pixels at the same positions in each horizontal line is to produce the vertical lines 106 which repeat every m pixels, m being the value in the register 14. It will be understood that, for a display resolution of p pixels per unit length, the distance h between the vertical lines 106 is given by the quotient m/p.

While the vertical lines 106 are produced as described above, the horizontal lines 104 are produced as follows. With each horizontal sync pulse of the horizontal sync signal Hsync (which occurs at the start of each horizontal line of the display), the counter 22 is decremented. When the count of the counter 22 reaches zero, the counter produces an output pulse which causes the counter to be reloaded with the value from the register 20. The output pulse from the counter 22 also (assuming that the enable signal VE is active) causes the AND gate 24 to produce an output signal, which is applied via the OR gate 26, the multiplexer 28 and the flip-flop 32 to the display. It will be appreciated that an output pulse produced by the counter 22 lasts for a whole line of the display. Thus, the display is activated throughout every pixel of each horizontal line for which the counter 22 produces an output pulse. The result of thus activating pixels throughout such horizontal lines is to produce the horizontal lines 104 which repeat every n pixels, n being the value in the register 20. It will be understood that, for a display resolution of p pixels per inch, the distance v between the horizontal lines 104 is given by the quotient n/p.

It will be understood that in the display system described above, the rectilinear grid pattern 100 is generated in a simple manner, with only a small amount of circuitry, and with only a minimal memory requirement for the horizontal and vertical grid spacing values. It will be further understood that this allows the grid display generation circuitry 12 to be easily incorporated with the on-screen display circuitry 30 into a single integrated circuit at little or no increase in cost.

It also be appreciated that the display system described above allows the rectilinear pattern of horizontal and vertical lines to be displayed simultaneously with the on-screen display menu 108, allowing the user to make geometric adjustments to the display with the aid of the displayed rectilinear grid pattern while having the on-screen menu 108 displayed to guide the user through the adjustment process.

It will further be appreciated that since the vertical lines 106 and the horizontal lines 104 are generated independently (and controlled by the separate enable signals VE and HE respectively), if desired only the vertical lines 102 or only the horizontal lines 104 might be displayed by applying only the relevant one of the enable signals.

It will further be appreciated that although the vertical lines 106 and the horizontal lines 104 are shown extending across the whole display screen 102, if desired the lines may be constrained to appear only within that portion of the screen which contains the on-screen menu 108.

It will further be appreciated that although the grid pattern may be typically displayed by activating the relevant pixels as light instead of dark, if desired the grid pattern may alternatively be displayed by activating the relevant pixels as dark while other pixels are displayed as light, or if appropriate the relevant pixels may be activated as a different colour than other pixels.

What is claimed is:

1. A circuit for use in generating a line pattern display, the circuit comprising:

display means for generating display elements which extend in first and second directions;

a first memory arranged to hold a value representative of pattern spacing in the first direction;

a first counter coupled to the first memory, the first counter arranged to count at the rate of display of elements in the first direction and to produce an output when its count is representative of an integer multiple of the value held in the first memory;

a second memory arranged to hold a value representative of pattern spacing in the second direction; and a second counter coupled to the second memory, the second counter arranged to count at the rate of display of elements in the second direction and to produce an output when its count is representative of an integer multiple of the value held in the second memory.

2. A circuit as claimed in claim 1 wherein the circuit is integrated with an on-screen display circuit for displaying on-screen information.

3. A circuit as claimed in claim 2 arranged to display simultaneously the line pattern and on-screen information.

4. A circuit for use in generating a line pattern display, the circuit comprising:

display means for generating display elements which extend in first and second directions;

a first memory arranged to hold a value representative of pattern spacing in the first direction;

a first counter coupled to the first memory, wherein the first counter is arranged to be loaded with the value held in the first memory, and to count to zero and thereupon to produce its output and to be re-loaded with the value held in the first memory;

a second memory arranged to hold a value representative of pattern spacing in the second direction; and a second counter coupled to the second memory, wherein the second counter is arranged to be loaded with the value held in the second memory, and to count to zero and thereupon to produce its output and to be re-loaded with the value held in the second memory.

* * * * *